United States Patent
Banerjee et al.

(10) Patent No.: US 7,603,403 B2
(45) Date of Patent: Oct. 13, 2009

(54) LOCALIZATION IN DISTRIBUTED COMPUTER ENVIRONMENTS

(75) Inventors: Debasish Banerjee, Rochester, MN (US); Jeffrey Alan Frey, New Paltz, NY (US); Robert Howard High, Jr., Round Rock, TX (US); Ute Schuerfeld, Wappingers Falls, NY (US); David Alan Zavala, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 09/870,319

(22) Filed: May 30, 2001

(65) Prior Publication Data

US 2002/0188722 A1    Dec. 12, 2002

(51) Int. Cl.
*G06F 15/16* (2006.01)

(52) U.S. Cl. .................. 709/201; 709/203; 709/218; 709/217; 709/232

(58) Field of Classification Search ............... 709/225, 709/200, 203, 103, 105, 201, 217, 218, 232; 395/650; 704/8; 717/130
See application file for complete search history.

(56) References Cited

U.S. PATENT DOCUMENTS

| | | | | |
|---|---|---|---|---|
| 5,404,523 A * | 4/1995 | DellaFera et al. | ........... | 718/101 |
| 5,680,610 A | 10/1997 | Smith et al. | | |
| 5,826,239 A | 10/1998 | Du et al. | | |
| 5,835,768 A | 11/1998 | Miller et al. | ................ | 395/682 |
| 5,900,871 A | 5/1999 | Atkin et al. | ................. | 345/334 |
| 5,907,326 A | 5/1999 | Atkin et al. | ................. | 345/334 |
| 5,944,790 A | 8/1999 | Levy | | |
| 6,147,693 A | 11/2000 | Yunker | | |
| 6,148,290 A | 11/2000 | Dan et al. | ...................... | 705/1 |
| 6,151,631 A * | 11/2000 | Ansell et al. | ................. | 709/229 |
| 6,161,139 A | 12/2000 | Win et al. | | |
| 6,167,567 A * | 12/2000 | Chiles et al. | ................. | 717/173 |
| 6,185,729 B1 | 2/2001 | Watanabe et al. | | |
| 6,219,632 B1 | 4/2001 | Schumacher et al. | ........... | 704/2 |
| 6,314,469 B1 | 11/2001 | Tan et al. | | |
| 6,393,474 B1 | 5/2002 | Eichert et al. | | |
| 6,430,607 B1 * | 8/2002 | Kavner | ....................... | 709/217 |
| 6,463,470 B1 | 10/2002 | Mohaban et al. | | |
| 6,496,793 B1 | 12/2002 | Veditz et al. | | |
| 6,621,793 B2 | 9/2003 | Widegren et al. | | |
| 6,643,652 B2 | 11/2003 | Helgeson et al. | | |
| 6,704,024 B2 | 3/2004 | Robotham et al. | | |
| 6,766,314 B2 | 7/2004 | Burnett | | |

(Continued)

OTHER PUBLICATIONS

Java Server Pages by Hans Bergsten Publisher: O'Reilly Publication Date : Dec. 2000 ISBN: 1-56592-746-x.*

(Continued)

*Primary Examiner*—William C Vaughn, Jr.
*Assistant Examiner*—Djenane M Bayard
(74) *Attorney, Agent, or Firm*—Patterson & Sheridan, LLP (57) ABSTRACT

A method and system for providing client locale information to a server in a distributed computer enterprise. When a client generates a request to a remote server, the client's locale and time zone information, known as the international context, is associated with the request. The server then processes requests from the client according to the internationalization context. The client's international context is propagated to successive servers that further service the client's request.

24 Claims, 8 Drawing Sheets

U.S. PATENT DOCUMENTS

| | | | |
|---|---|---|---|
| 6,857,023 | B2 | 2/2005 | Rivadalla et al. |
| 6,915,338 | B1 | 7/2005 | Hunt et al. |
| 6,983,238 | B2 | 1/2006 | Gao |
| 2002/0156688 | A1 | 10/2002 | Horn et al. |
| 2002/0162093 | A1* | 10/2002 | Zhou et al. ............ 717/130 |
| 2002/0184308 | A1* | 12/2002 | Levy et al. ............ 709/203 |
| 2002/0184509 | A1* | 12/2002 | Scheidt et al. ............ 713/185 |
| 2002/0184610 | A1* | 12/2002 | Chong et al. ............ 717/109 |

OTHER PUBLICATIONS

Internationalization of the Hypertext Markup Language, F. Yergeau, Jan. 1997, pp. 1-32.

"Preference Object-Based Internationalization for Distributed Application Framework in Java", Kenya Ishimoto and Satoshi Higuchi, 18th International Unicode Conference, Hong Kong, Apr. 2001.

N. Freed et al., "IANA Charset Registration Procedures," *Networking Group*, Oct. 2000, pp. 1-10. <http://www.rfc-editor.or/rfc/rfc2978.txt>.

Frank F.Y. Tang, "International Challenges for Netscape Communicator," Mar. 1997, *Tenth International Unicode Conference*, Mainz Germany.

R. Fielding et al., "Hypertext Transfer Protocol—HTTP/1.1," *Networking Group*, Jan. 1997, pp. 1-161. <http://www.ietf.org/rfc/rfc2068.txt>.

Bill Shannon, *Java 2 Platform Enterprise Edition Specification*, v.1.2, Final Release, Dec. 1999, Sun Microsystems, Inc.

Jason Hunter et al., *Java Servlet Programming Second Edition*, Apr. 2001, pp. 410-421.

James Duncan Davidson et al., *Java Servlet Specification*, v2.2, Final Release, Dec. 1999, Sun Microsystems, Inc.

"JavaServer Pages—Tomcat," date unknown, printed Jun. 23, 2005. <http://java.sun.com/products/jsp/tomcat/>.

Eduardo Pelegrí-Llopart et al., *JavaServer Pages Specification Version 1.1*, Nov. 1999, Sun Microsystems, Inc.

\* cited by examiner

LOCALIZATION IN DISTRIBUTED COMPUTER ENVIRONMENTS

BACKGROUND OF THE INVENTION

1. Field of the Invention

The present invention relates to a distributed computer enterprise and more particularly to a system and method for performing locale-sensitive operations on a remote server.

2. Description of the Related Art

Large organizations now desire to place all of their computing resources on a computer network. To this end, it is known to connect computers in a large, geographically dispersed network environment and to manage such an environment in a distributed manner. Illustratively, one such management framework consists of a server that manages a number of nodes, each of which has a local object database that stores object data specific to the local node. Each managed node typically includes a management framework, comprising a number of management routines that is capable of a relatively large number of simultaneous network connections to remote machines. The framework manages hundreds of megabytes of local storage and can spawn many dozens of simultaneous processes to handle requests from local or remote users.

In a conventional distributed computer environment it is often assumed that a server and its clients are operating in the same locale. This assumption no longer holds true for e-business and web applications. Managed nodes are often located across national boundaries. Thus, a typical managed network of the type described above may include offices located in numerous countries. Due to the worldwide acceptance of the Internet, a server is now more likely than ever to be physically located across a time zone from a remote user. It is also likely that the remote user will make a request that requires using cultural formatting conventions that are different from those of the server's locale. Conventionally, when a server processes a request from a remote user, the server will treat the request as if it occurred in the locale of the server. Without regard to the locale of the remote user, the server will impose its own local conventions when generating the results from the remote request. The remote user then receives the results of the request in a format that is unfamiliar to the user.

Figure 1:
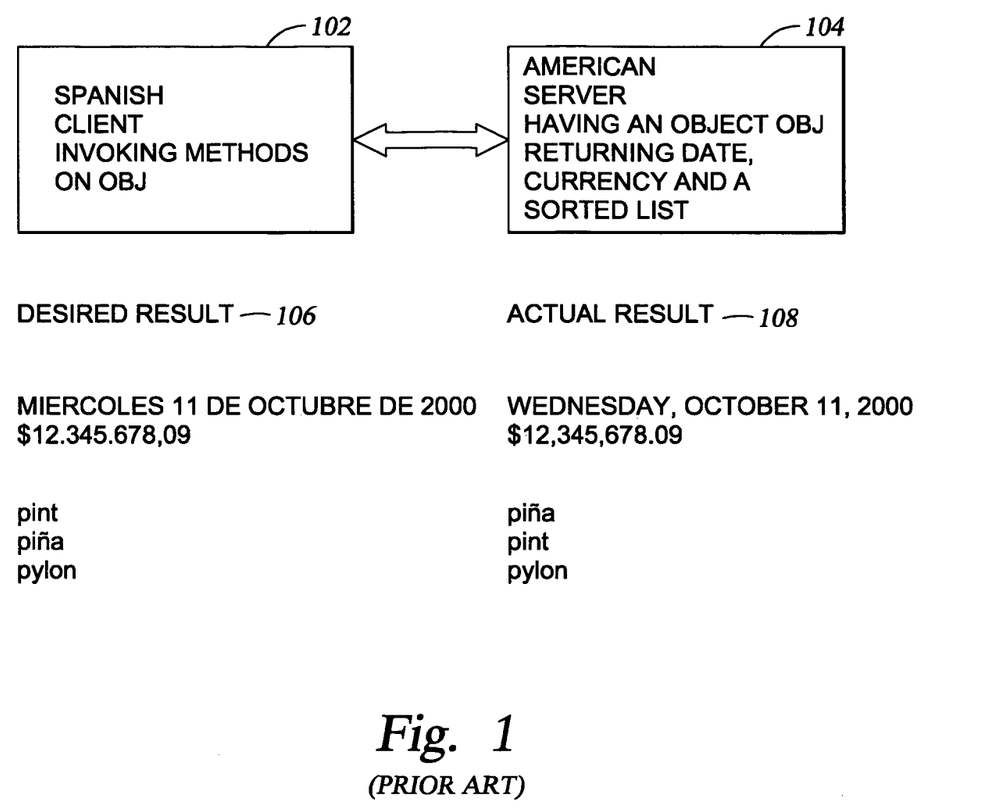
FIG. 1 illustrates an example of the results from a conventional method request made by a user/client on a remote server.

FIG. 1 illustrates one example of the results from a conventional request made by a user/client on a remote server. In this example, a Spanish client 102 has invoked a locale-sensitive request on an American server 104. In the conventional distributed computer environment, the server always imposes its locale upon the client. Consequently, the Spanish client will receive results in the format and time zone of the American locale and not in the desired Spanish locale. As shown, the desired result 106 of the Spanish client 102 was dramatically different from the actual result 108 returned by the American server 104. In the actual result, the server has translated the day and month from Spanish to English language and has also changed the day/date format to an American format. The American server changed the Spanish currency format by substituting commas for periods. And finally, the American server disregarded the accent "~" over the "n" in the Spanish word pina. This resulted in the American server providing an incorrect sorted list.

A possible solution to the conventional method is to add an extra parameter to all locale sensitive requests for conveying remote user internationalization context to the server. The parameter-addition solution, though outwardly simple, is intrusive, error prone and has serious limitations in real-life enterprise environments. For already deployed distributed applications, it is not possible to change interfaces for the introduction of extra parameters without incurring substantial network management overhead. Further, some protocols/languages will not support an extra parameter. For example, structured query language (SQL) queries do not have a placeholder to accommodate locale or time zone information.

Therefore, there is a need for a method and system for a server to process a user request using user specific internationalization context. There is also a need for such a method and system that can easily be implemented in a distributed computer network.

SUMMARY OF THE INVENTION

Embodiments of the present invention generally provide an article of manufacture, method and system for processing remote client requests in a distributed computer network using the client's specified locale conventions. In one embodiment, a system in a distributed computing environment has a plurality of nodes across geographically dispersed boundaries. The system comprises a server configured with an internationalization application programming interface configured to extract an internationalization context provided by a client device. A resource manager (e.g., application server, database management system, etc.) is configured to receive the internationalization context extracted by the server and process a request received from the client device using the internationalization context.

The internationalization process, which when executed by a processor of the server computer, processes requests from a client computer according to an internationalization context provided by the client.

In another embodiment, a server computer receives a first request from a remote client computer. Illustratively, the server computer then receives a second request from the client computer wherein the second request comprises an internationalization context comprising the client's preferred conventions for processing the first request. The server computer associates the second request with the first request for every thread of processing.

In still another embodiment, a server computer in a distributed computing environment receives an internationalization context from a client computer. The server then processes further requests from the client computer according to the internationalization context.

In still another embodiment, a server computer parses a message from a client computer wherein the message contains internationalization context. The server computer provides the internationalization context to an application. The internationalization context configures the application to process a request from the client computer according to the internationalization context.

In still another embodiment, a server computer configured with a default locale and time zone setting parses a first request from a client computer. The server computer also parses a second request from the client computer wherein the second request comprises an internationalization context. The internationalization context comprises a user specified locale and time zone specification. The server computer extracts the internationalization context from the second request and then processes the first request using the internationalization context.

In still another embodiment, a computer data signal embodied in a transmission medium comprises internationalization context. Illustratively, the internationalization context comprises at least a locale specification and a time zone identifier. The internationalization context is used to configure a processor of a computer to process requests according to the internationalization context.

In yet another embodiment, a method of transparently propagating internationalization context information is provided. The method comprises receiving, at a first computer, a first request from a second computer, the first request including an internationalization context; extracting the internationalization context from the first request; and associating the internationalization context with a thread executing at the first computer. In one embodiment, the internationalization context contains at least a locale specification and a time zone identifier.

In still another embodiment, a method of transparently propagating internationalization context information to an application associated with an application interface is provided. The method comprises generating a main body of a request and attaching an internationalization context to the main body, wherein the internationalization context is not added to the application interface. In one embodiment, the internationalization context contains at least a locale specification and a time zone identifier.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present embodiments provide an article of manufacture, a method and a system for processing remote user requests in a distributed computer network using the remote user's specified locale conventions. In one embodiment, the user's locale specific information, called the internationalization context, comprising the remote user's locale and/or time zone information, is sent to a server. The server extracts the remote user's internationalization context from the request and processes the remote user's request per the specified locale and/or time zone conventions. If the remote user's request is forwarded to another server, the internationalization context comprising the user's locale conventions propagates with the client's request to the other server. The internationalization context will continue to propagate to successive servers if further processing of the client's request is needed.

Figure 2:
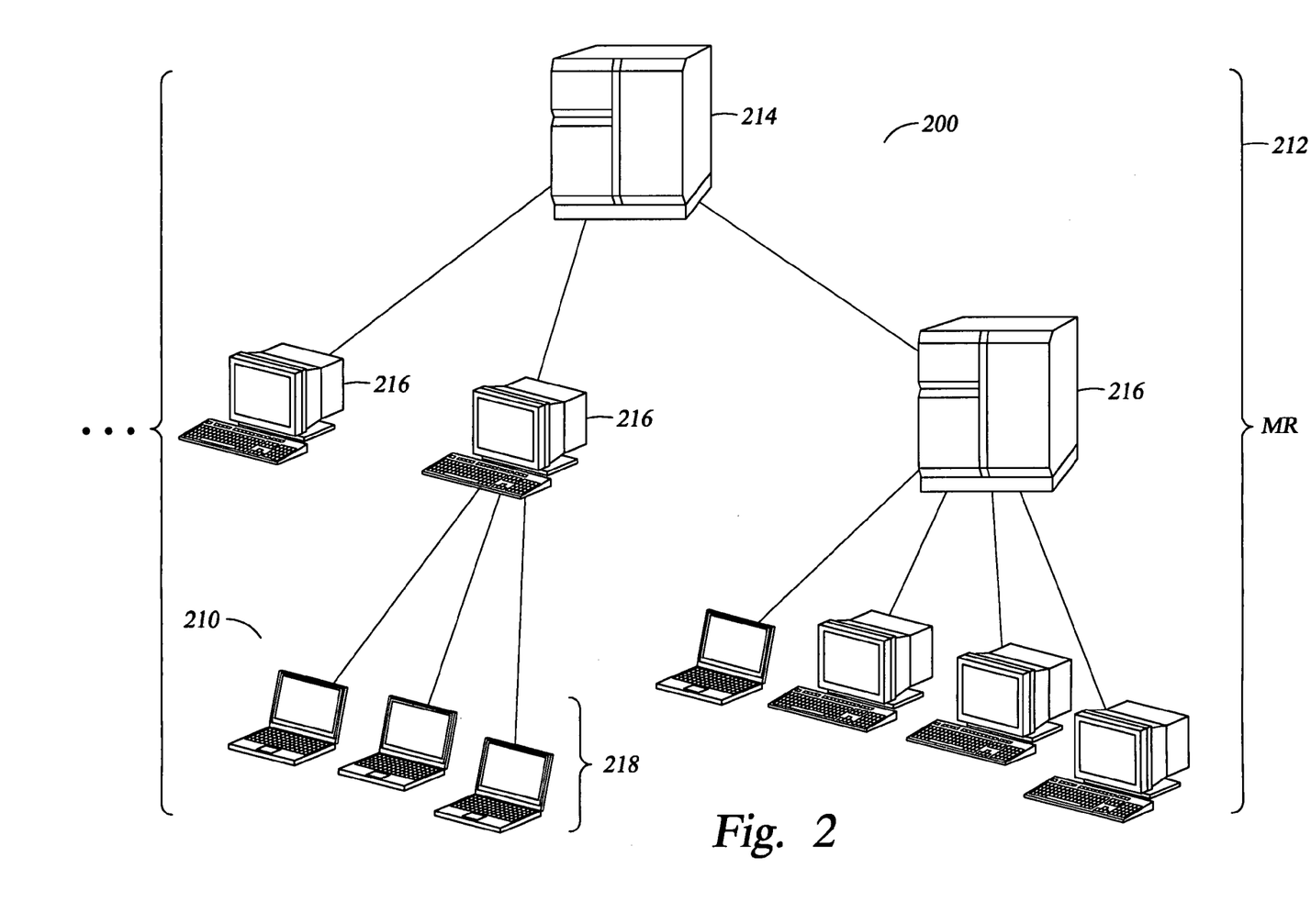
FIG. 2 illustrates a simplified diagram showing a large distributed computing enterprise environment.

FIG. 2 illustrates one embodiment of a large distributed computer environment 200 comprising up to thousands of "nodes". The nodes will typically be geographically dispersed and the overall environment is "managed" in a distributed manner. Preferably, the managed environment (ME) 200 is logically broken down into a series of loosely-connected managed regions (MR) 212, each with its own management server 214 for managing local resources with the MR. The network typically will include other servers (not shown) for carrying out other distributed network functions. These include name servers, security servers, file servers, thread servers and the like. Multiple servers 214 coordinate activities across the enterprise and permit remote management and operation. Each server 214 serves a number of gateway machines 216, each of which in turn support a plurality of endpoint machines 218. The server 214 coordinates all activity within the MR using terminal node manager 210.

Figure 3A:
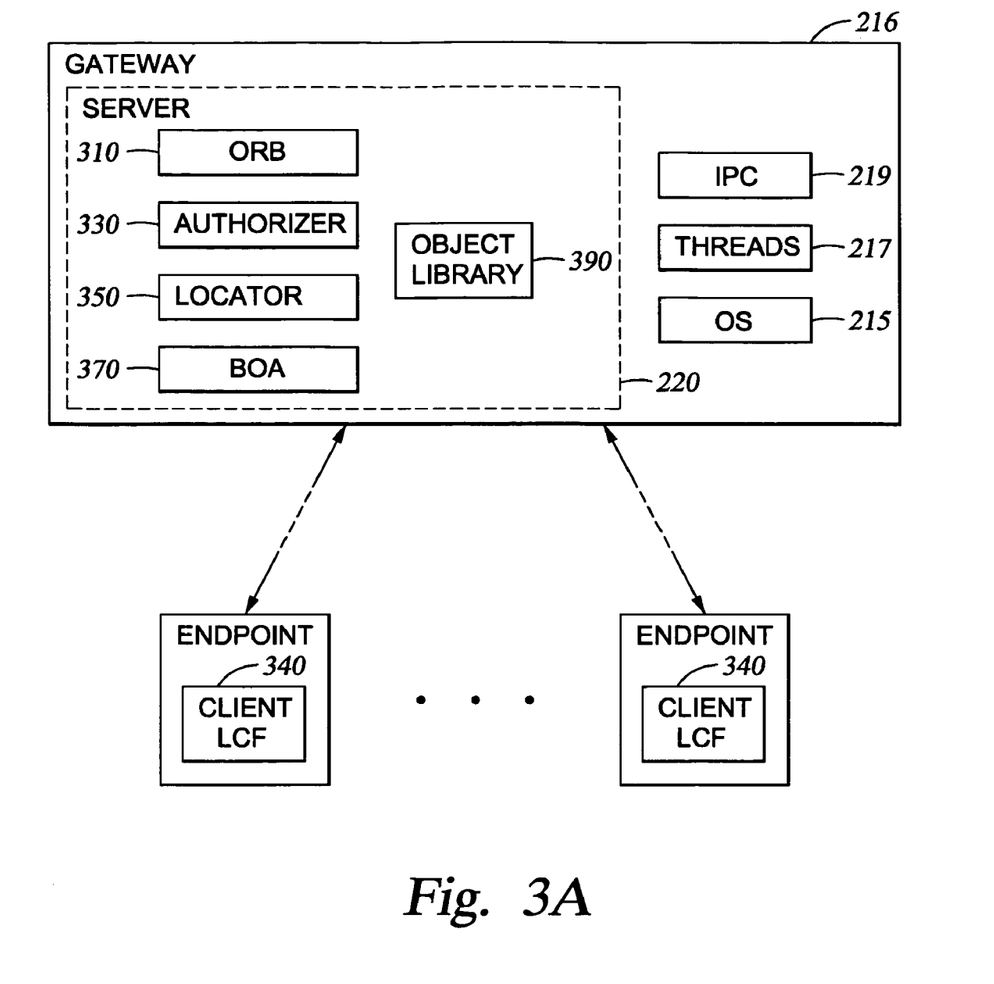
FIG. 3A illustrates a block diagram of a system management framework.

FIG. 3A illustrates each gateway machine 216 that runs a server component 320 of a system management framework. The server component 320 is a multi-threaded runtime process that comprises several components: an object request broker (ORB) 310, an authorization service 330, object location service 350 and basic object adapter (BOA) 370. Server component 320 also includes an object library 390. Preferably, the ORB 310 runs continuously, separate from the operating system and it communicates with both server and client processes through separate stubs and skeletons via an inter-process communication (IPC) facility 219. In particular, a secure remote procedure call (RPC) is used to invoke operations on remote objects. Gateway machine 216 also includes a thread mechanism 217. The thread mechanism 217 is known in the art and assigns a thread identifier to each request made by a user at a gateway machine 216. The thread identifier may be any alphanumeric representation. The thread identifier is associated with the request so that the server can track the request and send a response to the proper gateway machine 216.

The system management framework includes a client component 340 supported on each of the endpoint machines 218. The client component 340 is a low cost, low maintenance application suite that is preferably "data-less" in the sense that system management data is not cached or stored there in a persistent manner. Implementation of the management framework in this "client-server" manner has significant advantages over the prior art, and it facilitates the connectivity of personal computers into the managed environment. Using an object-orientated approach, the system management framework facilitates execution of system management tasks required to manage the resources in the MR.

Figure 4:
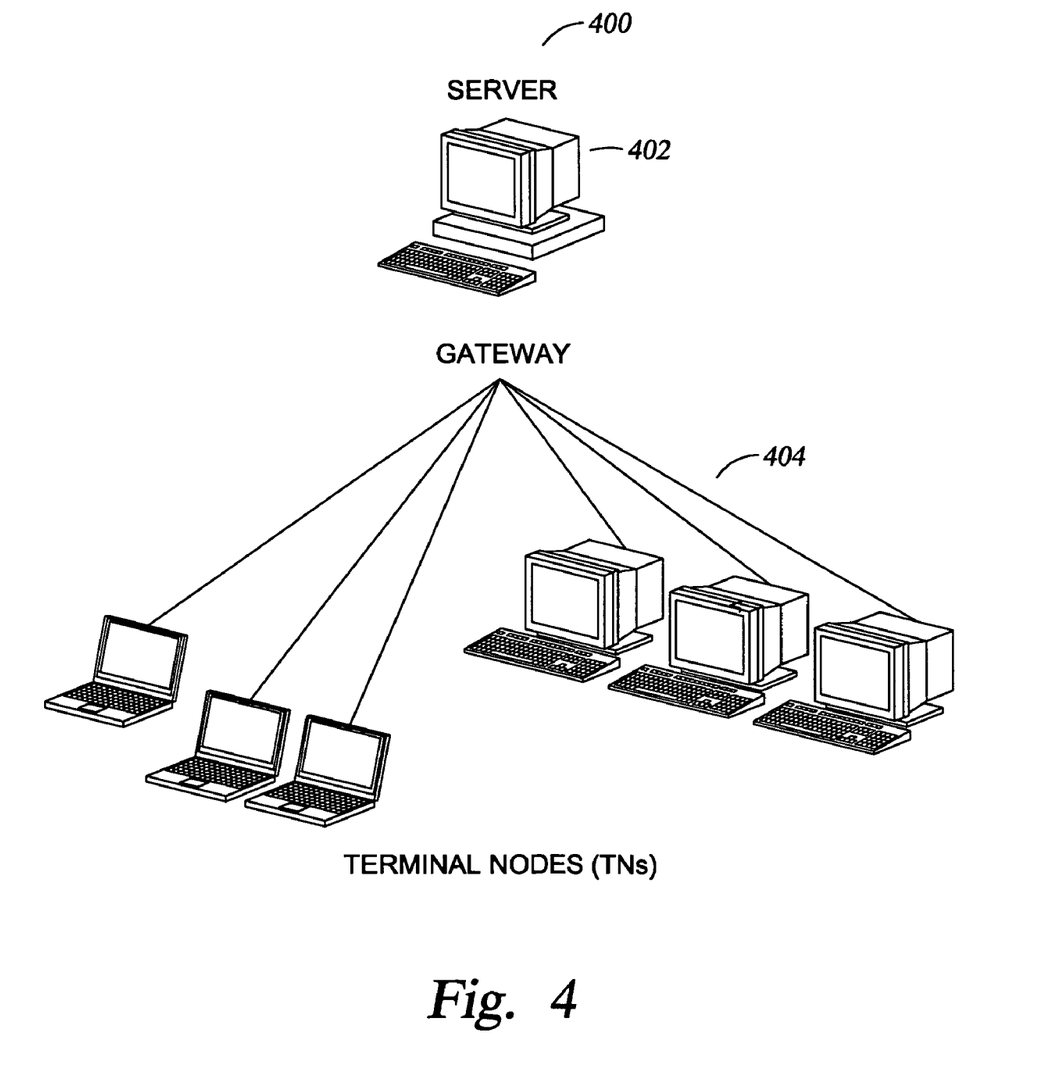
FIG. 4 illustrates a small implementation of the distributed computing enterprise environment.

In a large computer enterprise such as illustrated in FIG. 2, preferably there is one server per MR with some number of gateways. For a workgroup-size installation 400 (a local area network, for example) such as illustrated in FIG. 4, a single server class machine 402 may be used as the server and gateway to a plurality of terminal nodes 404. References herein to a distinct server and one or more gateway(s) should thus not be taken by way of limitation as these elements may be combined into a single platform. For intermediate size installations, the MR grows with additional gateways then being used to balance the load of the endpoints.

The server 214 is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

Illustratively, there are one or more gateways per managed region. Preferably, a gateway is a fully managed node that has been configured to operate as a gateway. Initially, a gateway "knows" nothing about endpoints. As endpoints login, the gateway builds an endpoint list for its endpoints. The gateway's duties preferably include listening for endpoint login requests, listening for endpoint update requests, and acting as a gateway for method invocations on endpoints.

Figure 3B:
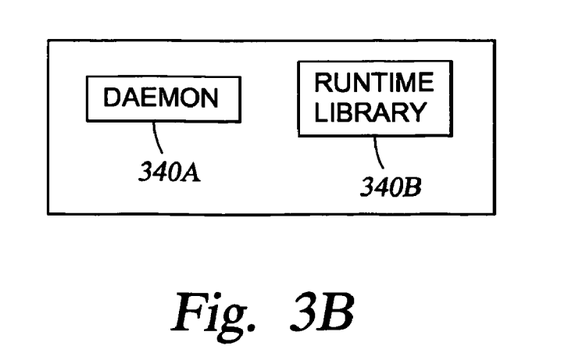
FIG. 3B illustrates a block diagram of the elements in a computer component of the system management framework.

The endpoint is a machine running the system management framework client component, which is referred to herein as a management agent. The management agent has two main parts, the daemon 340*a* and application runtime library 340*b*, as illustrated in FIG. 3B. The daemon 340*a* is responsible for endpoint login and for spawning application endpoint executables. Once an executable is spawned, the daemon 340*a* has no further interaction with it. Each executable is linked with the application runtime library 340*b*, which handles all further communication with the gateway.

Preferably, the server and each of the gateways are a computer or "machine". As an illustration, each computer may be a RISC (reduced instruction set computer) System/6000® running AIX (Advanced Interactive Executive) operating system. Suitable alternative machines include an IBM-compatible PC running Novell UnixWare or an AT&T 3000 series machine running AT&T UNIX. Other machines and/or operating systems may be used for the gateway and server machines.

Each endpoint is also a computer. In one embodiment, the endpoints are personal computers such as desktop machines, laptops, hand-held personal digital assistants (PDA) or the like. The endpoints need not be high powered or complex machines or workstations. Illustratively, one or more of the endpoints may be a notebook computer, for example, the IBM ThinkPad® machine, some other Intel x86 or Pentium®-based computer running the Windows operating system or IBM-compatible machines running under the OS/2® operating system. An endpoint computer preferably includes an Internet client navigation program such as Netscape Navigator or Microsoft Internet Explorer. An endpoint computer thus may be connected to a gateway via the Internet, an Intranet or some other computer network. The connection to a gateway may be wireless using radio frequency energy, visible or non-visible light emissions or through a hard-wire link.

Moreover, while the embodiments have and hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. Examples of computer readable storage medium include, but are not limited to, recordable type media such as volatile and nonvolatile memory devices, floppy and other removable disks, hard disk drives, optical disks (e.g., CD-ROMs, DVDs, etc.). Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

In one embodiment, a computer system operative in the managed environment provides client locale and time zone information, collectively called the internationalization context, to a server and every thread of execution within an application performed at the server. When a client invokes a remote operation at a remote server, the internationalization context associated with the current thread is sent along with the outgoing request. The server detaches the internationalization context from the incoming request and associates it with the thread on which the remote operation will execute. The server then uses the information in the internationalization context for every locale sensitive process performed on the client request. If the server propagates the request to another server or database manager for further processing, the internationalization context associated with the request will also be propagated.

Figure 5:
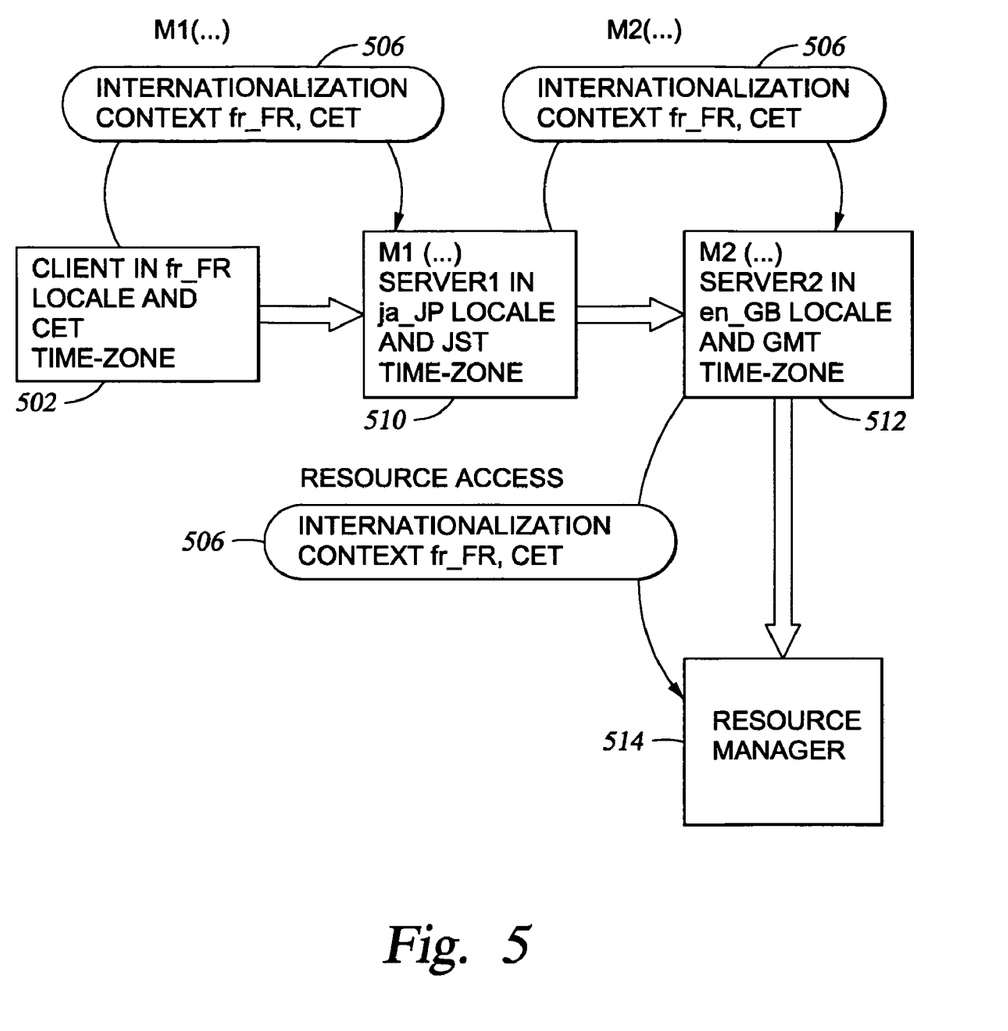
FIG. 5 illustrates the propagation of the internationalization context from a client request to a remote server.

FIG. 5 illustrates the propagation of the internationalization context 506 from a client request to a remote server. The client 502 is located in a French locale and CET (central European time) time zone. The internationalization context 506, comprising the client's locale and time-zone information, is transmitted separately from the called method function m1( ... ). Upon receiving the client request at the server 510 in the Japan locale and JST (Japanese standard time) time zone, the server 510 will extract the client's internationalization context and process the request using the client's internationalization context. In this example, it is necessary to further process the client request at other remote servers 512, 514 located in different locales and time zones. As illustrated, the client's internationalization context 506 propagates with each successive call to a remote server. With each successive call to a remote server, each remote server will extract the locale specific information in the client's internationalization context 506 and process the request using the information.

Figure 6A:
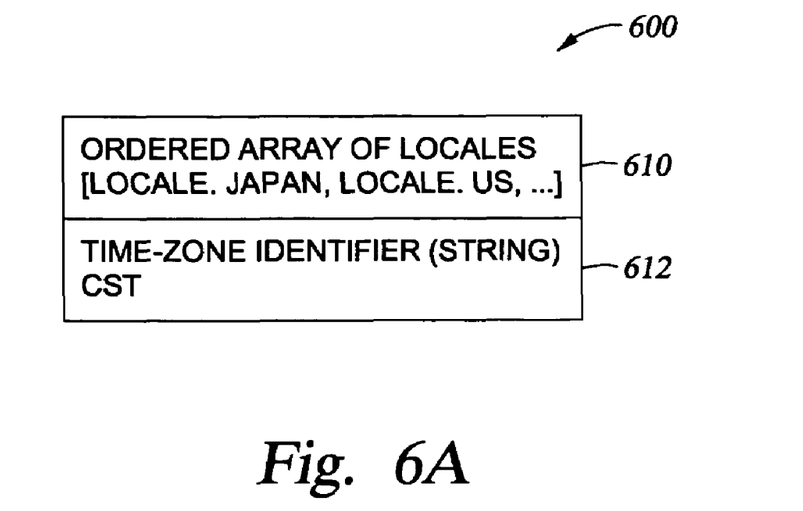
FIGS. 6A and 6B illustrates one embodiment of the internationalization context data structure.
Figure 6B:
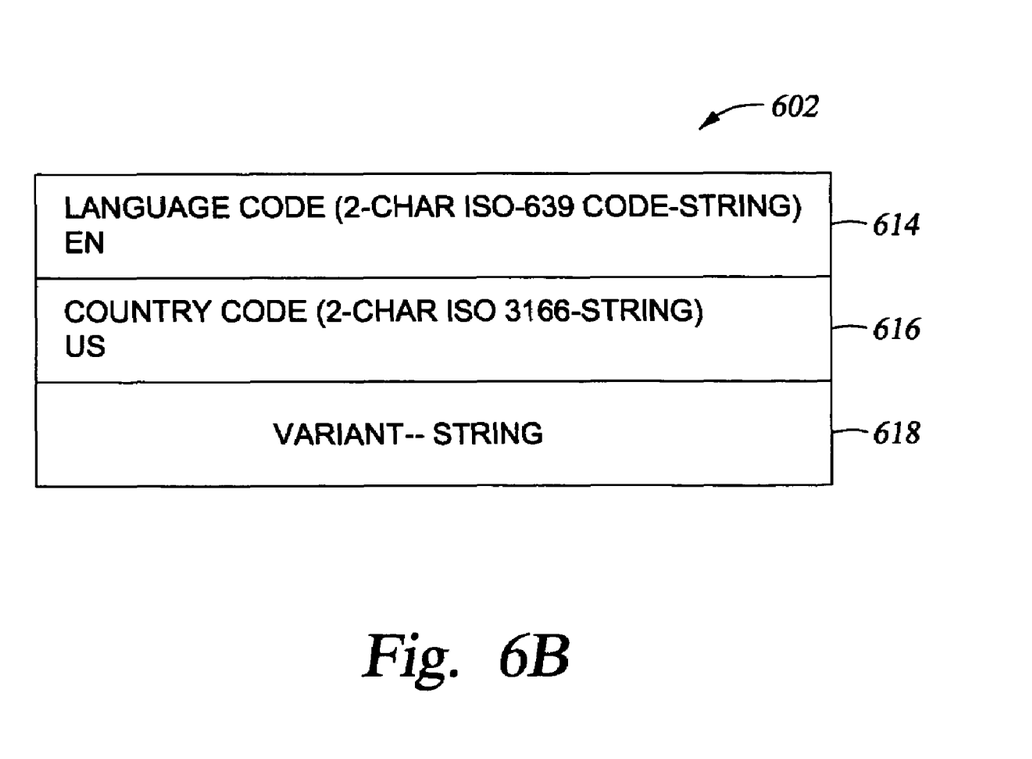

FIG. 6A illustrates one embodiment of the internationalization context data structure 600. The internationalization context data structure 600 comprises an ordered array of locales 610 and a time-zone identifier 612. The ordered array of locales is a sequential list of preferred locales for processing the client request. Illustratively, the most preferred locale will be selected for the client locale. FIG. 6B further illustrates the data structure for a locale entry 602 contained in the ordered array of locales 610. Illustratively, the locale entry 602 comprises a language code 614, a country code 616 and a variant-string 618. The language code 614 may be a two character ISO-639 standard identifier. The country code 616 may be a two character ISO-3166 standard identifier. The variant-string 618 may contain further locale sensitive information such as currency formatting data or specifying a region within a country, for example. One of ordinary skill will appreciate that the foregoing illustrated example of the internationalization context data structure 600 is merely representative. It should be appreciated that other logical combinations of locale specific information may be contained in the internationalization context data structure 600. In particular, the internationalization context 610 and the time zone identifier 612 may be spread over a plurality of data structures and cross referenced by pointers.

In one embodiment, the internationalization context 600 may be implemented as a common object, processed by the ORB 210 (see FIG. 2) within CORBA (common object request broker architecture). CORBA is an architecture that enables pieces of programs, called objects, to communicate with one another regardless of what programming language they were written in or what operating system they are running on. There are several implementations of CORBA, the most widely used being IBM's SOM (system object model) and DSOM (distributed system object model) architectures. SOM is an architecture developed by IBM that allows binary code to be shared by different applications. DSOM is a version of SOM that supports sharing binary objects across networks.

The Netscape Internet Web browser has also embraced CORBA. Following is an example of pseudo-code for a CORBA interface to the internationalization context:

TABLE I

001 Resolve a CORBA Object reference for the Internationalization Service Current interface by calling ORB method resolve_initial_reference( ).
002 Narrow the reference to the Current interface by calling method narrow( ) on a CurrentHelper class.
003 Specify locale and time zone by calling Current interface methods set_locale( ) and set_timezone_id( ).

In another embodiment, the internationalization context may be implemented in a JAVA computing language environment. As is known in the art, JAVA is an object-oriented, multi-threaded, portable, platform-independent, secure programming environment used to develop, test and maintain software programs. These programs include full-featured interactive, standalone applications, as well as smaller programs, known as applets, that are executed by a JAVA virtual machine (JVM).

The internationalization context may be implemented from a server 512 (see FIG. 5) to a resource manager 514 using the J2EE EJB connector architecture. J2EE (JAVA version-2 enterprise edition enterprise JAVA Beans) is a platform-independent, JAVA-centric environment from Sun for developing, building and deploying Web-based and distributed enterprise applications on-line. The J2EE platform consists of a set of services, API's and protocols that provide the functionality for developing multi-tiered, Web-based and distributed computer system enterprise applications. The following illustrates one example of pseudo-code for a JAVA J2EE EJB encoded interface to the internationalization context.

TABLE II

001 Resolve a Java Object reference to the Internationalization Service UserInternationalization interface by performing a JNDI (Java Naming and Directory Interface) lookup for the URL of a UserInternationalization interface on an InitialContext object.
002 Narrow the reference to the UserInternationalization interface by invoking method narrow( ) on RMI-IIOP PortableRemoteObject object.
003 Call UserInternationalization method getInvocationInternationalization( ) to obtain a reference to InvocationInternationalization interface.
004 Specify invocation locale and time zone by calling InvocationInternationalization methods setLocale( ) and setTimezoneId( ).

As is evident from the foregoing exemplary interfaces, three steps are provided to implement a remote object within the CORBA and J2EE programming models. The three steps are (i) obtaining a reference to an interface, (ii) casting (i.e., narrowing) the remote reference to the appropriate interface type, and then (iii) utilizing the interface to perform a desired function. In the first step, an object reference to the "I18nContext" (Internationalization context) interface is provided by the internationalization service. (The term internationalization service as used herein is the implementation of the internationalization context over a distributed enterprise.) The interface to the internationalization service is made via a call to the ORB 310. In the second step, the object reference to the internationalization service is then narrowed. In the third step, the narrowed reference is used to manage the locale and time zone information contained in the internationalization context.

Figure 7:
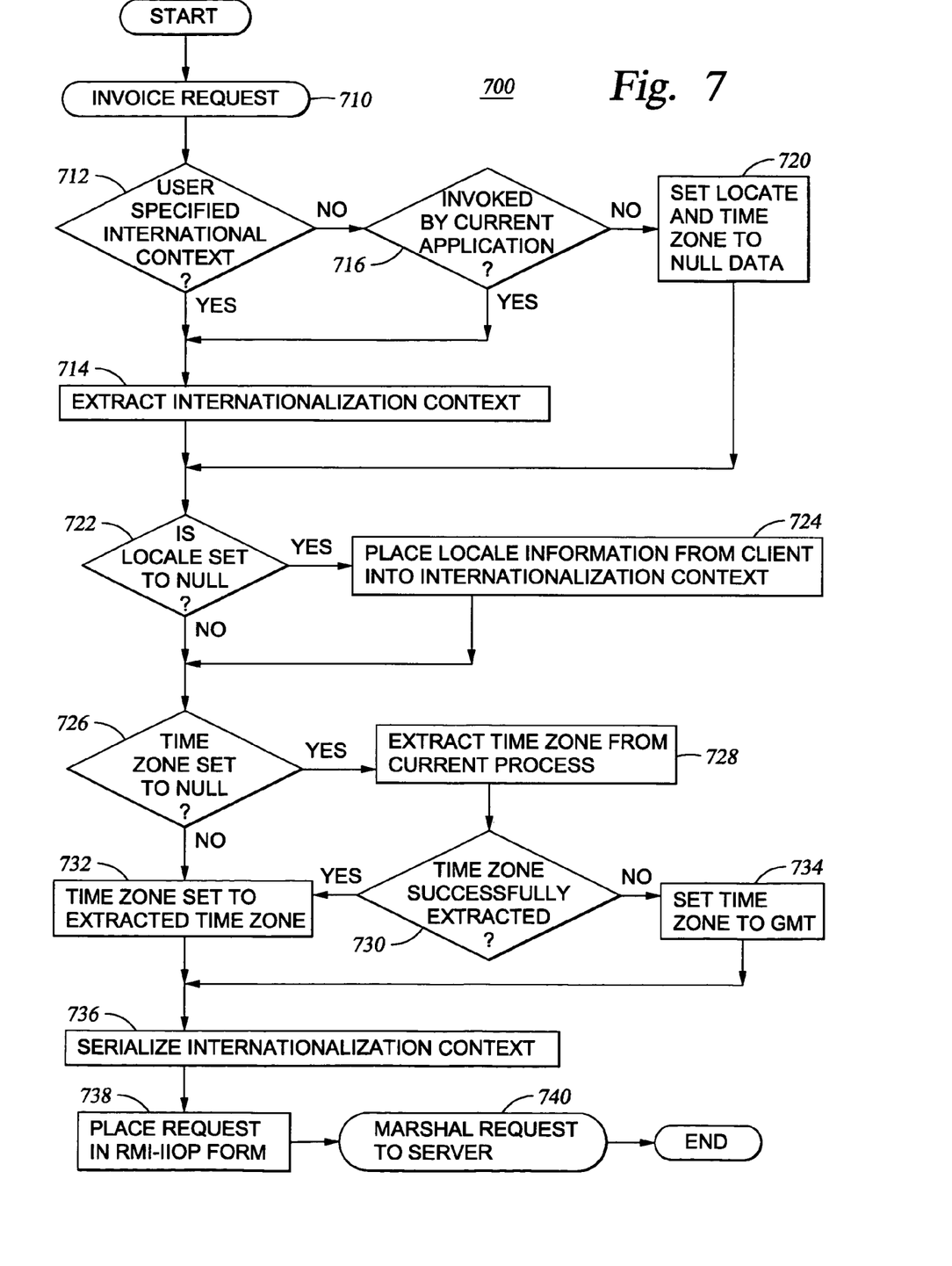
FIG. 7 illustrates a flowchart of the method at the client computer.

FIG. 7 illustrates a flowchart implementing the internationalization context at a client side. The routine is invoked whenever the client implements a request to a remote server. The routine begins at step 710 when the client application component invokes a request to a server. The routine then queries, at step 712, if the user specified any internationalization context to be sent on the thread associated with the request. If so, the routine proceeds to step 714 where the information in the internationalization context is extracted. If not, the routine proceeds to step 716 where the routine queries if the internationalization context was invoked by the client's application. If so, the routine proceeds to step 718 to extract the information in the internationalization context. If not, the routine proceeds to step 720 where the internationalization context is determined to be empty of information or does not exist at all. The routine then sets the locale information and time zone information to null data. The routine then proceeds to step 722.

At step 722, the routine queries if the locale information in the internationalization context is set to null data. If so, the routine places the locale information from the default setting of the client computer and places it in the internationalization context at step 724 and proceeds to step 726. If the internationalization context is not set to null data, the routine, at step 726, queries if the time zone information is set to null data. If so, the routine attempts to extract the time zone information from the current process environment at step 728 and proceeds to step 730. At step 730, the routine queries if the time zone information was successfully extracted from the current process environment. If so, the routine proceeds to step 732 where the time zone is set to the extracted time zone. If not, the routine proceeds to step 734 where the time zone is set to Greenwich Mean Time (GMT). The routine then proceeds to step 736.

At step 736, the information contained in the internationalization context is converted into serialized form and then placed with the outgoing request in RMI-IIOP form at step 738. The routine then proceeds to step 740 where the request is formatted to the server.

Figure 8:
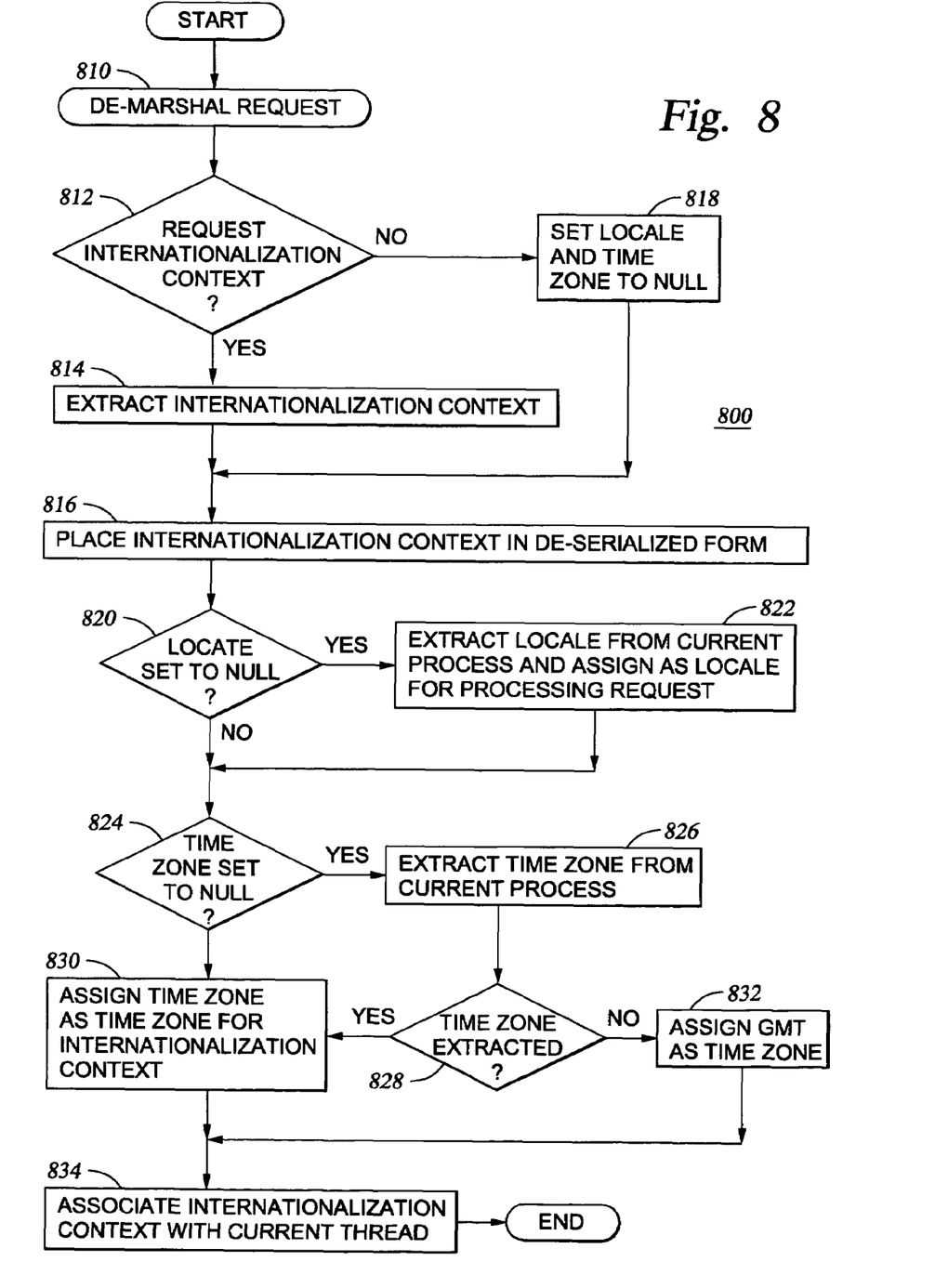
FIG. 8 illustrates a flowchart of the method at the server computer.

FIG. 8 illustrates a flowchart implementing the internationalization context 600 at a server computer. The routine begins at step 810 where the ORB 310 de-marshals the incoming RMI-IIOP request. At step 812, the routine queries if the request contains serialized internationalization context. If so, the internationalization context is extracted from the request at step 814. If the request does not contain the internationalization context, the routine, at step 818, sets the locale and time zone information is set to null. The routine then proceeds to step 816 where the serialized internationalization context is placed in de-serialized form.

At step 820, the routine queries if the locale information in the internationalization context is set to null. If so, the routine proceeds to step 822 where the default locale of the server is extracted and assigned as the locale for processing the request. If the locale information is not set to null, the routine, at step 824, queries if the time zone information is set to null. If so, the routine, at step 826, attempts to extract the time zone information from the current process environment. At step 828, the routine queries if the time zone information was successfully extracted. If not, the routine, at step 832, assigns GMT time as the time zone for the internationalization context. If so, the successfully extracted time zone information is assigned as the time zone of the internationalization context at step 830. At step 834, the information contained in the internationalization context is associated with the current thread making it available for processing the request.

Accordingly, the present embodiments provide for transmitting and processing internationalization information. Receiving machines (e.g., servers) are configured (e.g., with Application programming interfaces (APIs)) to provide the internationalization information to an application. The application may then use the internationalization information in preparing a response to a client or in order to perform processing in general. For example, the internationalization information may be used to format a response according user preferences. In another embodiment, the internationalization information may provide rules or conditions for calculations (e.g., preparing tax returns, e-Commerce transactions, etc.). In this manner, the present embodiments ensure meaningful network transactions that are sensitive to international diversity.

While the foregoing is directed to embodiments of the present invention, other and further embodiments of the invention may be devised without departing from the basic scope thereof, and the scope thereof is determined by the claims that follow.

What is claimed is:

1. A computer-implemented method operative in a distributed computing environment having clients and a plurality of servers located across geographically dispersed boundaries, comprising:

receiving, at a server, a first request from a client, wherein the first request is a request to invoke a remote procedure call at the server;

receiving, at the server, a second request from the client, wherein the second request comprises an internationalization context for processing the first request, wherein the internationalization context specifies geographically specific parameters set for the client;

extracting the internationalization context from the second request;

processing the first request at the server using the internationalization context, wherein processing the first request comprises:

providing the first request and internationalization context to an application configured to perform calculations requested by the remote procedure call using the geographically specific parameters included in the internationalization context and further configured to return a result formatted according to a formatting convention selected based on the geographically specific parameters; attaching the internationalization context to the first request; and propagating the first request with the attached internationalization context from the server to an application associated with an application interface on a second server.

2. The method of claim 1, further comprising sending the internationalization context from the server to at least one of the plurality of servers in the distributed computing environment.

3. The method of claim 1, wherein the internationalization context contains a country identifier.

4. The method of claim 1, wherein the internationalization context contains a language identifier.

5. The method of claim 1, wherein the internationalization context contains a time zone identifier.

6. The method of claim 1, wherein the internationalization context contains at least a locale specification and a time zone identifier.

7. The method of claim 6, wherein the locale specification comprises at least one of a country identifier, a language identifier and a currency identifier.

8. The method of claim 1, further comprising processing the first request according to a country identifier of the server if the internationalization context does not contain a country identifier.

9. The method of claim 1, further comprising processing the first request according to a universal time zone identifier if the internationalization context does not contain a time zone identifier of the client.

10. The method of claim 1, further comprising processing the first request according to a time zone identifier of the server if the internationalization context does not contain a time zone identifier.

11. A computer-readable storage medium, comprising a program which, when executed by a processor of a server configured with a default locale setting and a default time zone setting, performs a method, comprising:

parsing a first request from a client computer;

parsing a second request from the client computer, wherein the second request comprises an internationalization context containing a user specified locale specification and a time zone identifier;

extracting the client's internationalization context from the second request;

processing the first request at the server using the internationalization context, wherein processing the first request comprises:

providing the first request and internationalization context to an application configured to perform calculations requested by the remote procedure call using the geographically specific parameters included in the internationalization context and further configure to return a result formatted according to a formatting convention selected based upon the geographically specific parameters;

generating a main body of a second request to invoke a second remote procedure call;

attaching the internationalization context to the main body; and propagating the second request with the attached internationalization context from the server to an application associated with an application interface on a second server.

12. The computer-readable storage medium of claim 11, further comprising sending the internationalization context from the server to at least one of the plurality of servers in the distributed computing environment.

13. The computer-readable storage medium of claim 11, wherein the internationalization context contains a country identifier.

14. The computer-readable storage medium of claim 11, wherein the internationalization context contains a language identifier.

15. The computer-readable storage medium of claim 11, wherein the internationalization context contains a time zone identifier.

16. The computer-readable storage medium of claim 11, wherein the internationalization context contains at least a locale specification and a time zone identifier.

17. The computer-readable storage medium of claim 16, wherein the locale specification comprises at least one of a country identifier, a language identifier and a currency identifier.

18. The computer-readable storage medium of claim 11, further comprising processing the first request according to a country identifier of the server if the internationalization context does not contain a country identifier.

19. The computer-readable storage medium of claim 11, further comprising processing the first request according to a time zone identifier provided by the server if the time zone identifier of the internationalization context is set to null.

20. A method for transparently propagating internationalization context information, comprising:
- receiving, at a first computer, a first request from a second computer, the first request including an internationalization context, wherein the internationalization context specifies geographically specific parameters set for the client computer;
- extracting the internationalization context from the first request;
- associating the internationalization context with a thread executing a second request, from the second computer, to invoke a remote procedure call at the first computer;
- generating a main body of a second request to invoke a second remote procedure call;
- attaching the internationalization context to the second request; and
- propagating the second request with the attached internationalization context from the server to an application associated with an application interface on a second server, wherein the application of the second server is configured to perform calculations requested by the second remote procedure call using the geographically specific parameters included in the internationalization context and is further configured to return a result formatted according to a formatting convention selected based on the geographically specific parameters.

21. The method of claim 20, wherein the internationalization context contains at least a locale specification and a time zone identifier.

22. The method of claim 20, further comprising sending a first main body of the first request to the thread.

23. The method of claim 20, wherein the thread comprises a legacy application thread.

24. The method of claim 20, wherein the internationalization component comprises culture sensitive information.

* * * * *

UNITED STATES PATENT AND TRADEMARK OFFICE
CERTIFICATE OF CORRECTION

PATENT NO. : 7,603,403 B2 Page 1 of 1
APPLICATION NO. : 09/870319
DATED : October 13, 2009
INVENTOR(S) : Banerjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1132 days.

Signed and Sealed this

Fifth Day of October, 2010

David J. Kappos
*Director of the United States Patent and Trademark Office*